US000001328H

United States Statutory Invention Registration [19]

[11] Reg. Number: H1328

Horton et al.

[43] Published: Jul. 5, 1994

[54] ADJUSTABLE AEROMEDICAL EQUIPMENT BRACKET

[75] Inventors: Melvin S. Horton, Prattsburg, N.Y.; Thomas E. Philbeck, Jr., San Antonio, Tex.

[73] Assignee: The United States of America as represented by the Secretary of the Air Force, Washington, D.C.

[21] Appl. No.: 963,978

[22] Filed: Oct. 20, 1992

[51] Int. Cl.[5] ..... E04G 3/00; F16M 11/38; A47F 5/00

[52] U.S. Cl. ..... 248/276; 248/172; 248/309.1

[58] Field of Search ..... 248/97, 122, 172, 200.1, 248/276, 295.1, 298, 309.1, 124, 287

[56] References Cited

U.S. PATENT DOCUMENTS

| | | | |
|---|---|---|---|
| 593,139 | 11/1897 | Thomas | 248/124 X |
| 963,040 | 7/1910 | Feldman | 248/172 X |
| 2,431,100 | 11/1947 | Woods | 248/124 X |
| 2,628,803 | 2/1953 | Krewson | 248/172 X |
| 3,022,974 | 2/1962 | Knodel | 248/200.1 |
| 3,031,215 | 4/1962 | Vance | 248/124 X |
| 3,185,422 | 5/1965 | Spindler | 248/287 X |
| 3,206,249 | 9/1965 | Gateley | 248/172 X |
| 3,398,919 | 8/1968 | Tokar | 248/103 |
| 4,332,378 | 6/1982 | Pryor | 482/68 |
| 4,783,025 | 11/1988 | Moffett | 244/118.5 |
| 4,783,109 | 11/1988 | Bucalo | 296/20 |
| 4,886,237 | 12/1989 | Dennis | 248/289.1 |
| 4,957,121 | 9/1990 | Icenogle et al. | 128/897 |

*Primary Examiner*—David Brown
*Attorney, Agent, or Firm*—Donald J. Singer; Bobby D. Scearce

[57] ABSTRACT

A support bracket for securing medical equipment on or near a litter carried within a medical vehicle, which comprises an extensible tubular member having a threaded lock fitting along the length thereof for locking the extensible member at selected length, first and second tubular end members of preselected inner diametric size attached to the ends of the extensible member for receiving a pair of substantially parallel rod members, such as the handles of a litter, and a pair of set screws threaded into the tubular end members for releasably securing the rod members within the tubular end members.

9 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADJUSTABLE AEROMEDICAL EQUIPMENT BRACKET

RIGHTS OF THE GOVERNMENT

The invention described herein may be manufactured and used by or for the Government of the United States for all governmental purposes without the payment of any royalty.

BACKGROUND OF THE INVENTION

The present invention relates generally to equipment mounting devices and more particularly to a bracket for securing medical equipment on or near litters carried within a medical vehicle.

Previously existing systems and devices for mounting and securing medical equipment near movable litters within a medical vehicle, such as an ambulance or aeromedical aircraft cabin, have been substantially limited to items such as cargo tie-down straps and makeshift arrangements of tape, rope, cord and the like. As a consequence, the use of emergency medical equipment for the treatment of patients carried on a litter within such a vehicle has been undesirably awkward.

The invention solves or substantially reduces in critical importance problems with existing systems as just described by providing a convenient, lightweight device for safely and effectively mounting medical equipment near a litter within a medical vehicle. The invention comprises an extensible tubular member having on each end thereof a pair of tubular end members sized and disposed to receive the handle ends of a standard (Department of Defense) litter or corresponding handle ends of two such litters tiered within a medical vehicle.

It is therefore a principal object of the invention to provide an improved medical equipment mounting device.

It is a further object of the invention to provide a medical mounting bracket for securing medical equipment on or near a litter carried within a medical vehicle.

These and other objects of the invention will become apparent as a detailed description of representative embodiments proceeds.

SUMMARY OF THE INVENTION

In accordance with the foregoing principles and objects of the invention, a support bracket for securing medical equipment on or near a litter carried within a medical vehicle is described which comprises an extensible tubular member having a threaded lock fitting along the length thereof for locking the extensible member at selected length, first and second tubular end members of preselected inner diametric size attached to the ends of the extensible member for receiving a pair of substantially parallel rod members, such as the handles of a litter, and a pair of set screws threaded into the tubular end members for releasably securing the rod members within the tubular end members.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
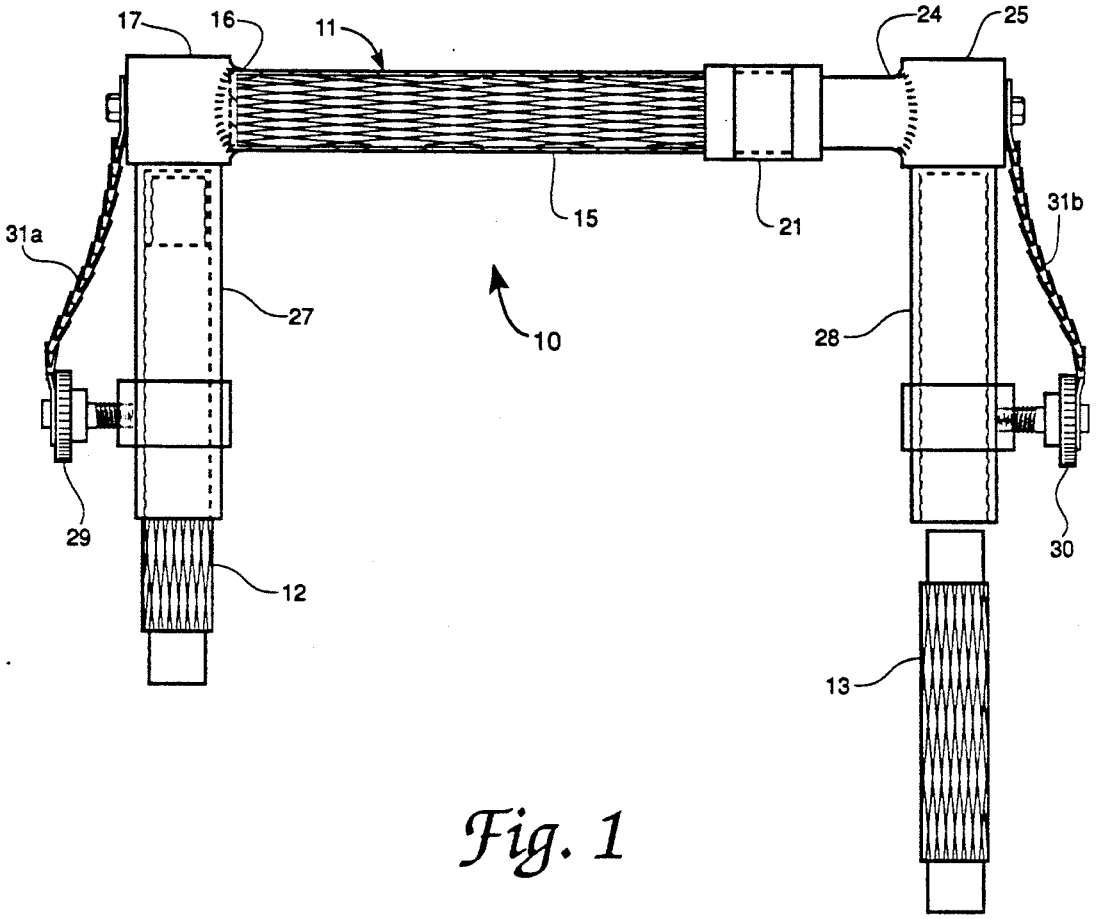
FIG. 1 is a plan view of an assembly comprising the invention.
Figure 2A:
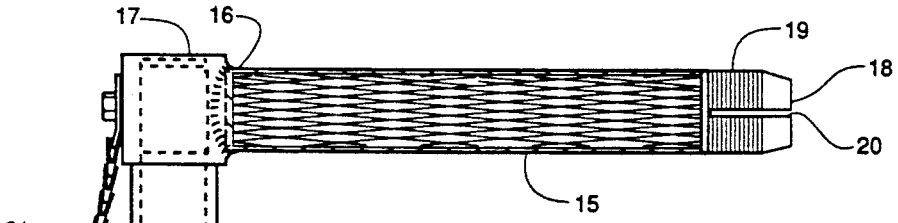
FIGS. 2*a* and 2*b* show the FIG. 1 embodiment disassembled into its component parts.
Figure 2B:
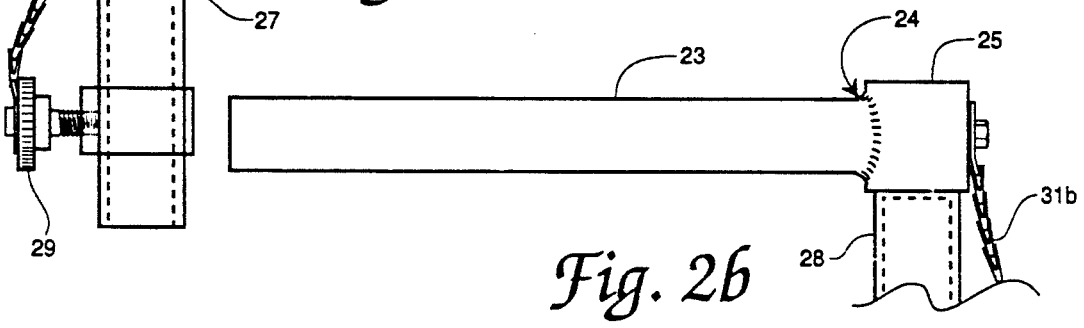

Referring now to the drawings, FIG. 1 shows a plan view of an assembly 10 of the invention, including an extensible C-shaped bracket 11 and a pair of short poles 12,13. FIGS. 2*a* and 2*b* show bracket 11 disassembled into its component parts. Bracket 11 includes tubular member 15 of any convenient size terminating at one end 16 thereof in corner member 17 and at the other end 18 thereof in externally tapered threaded portion 19, including diametric slot 20, for receiving internally threaded lock fitting 21. Rod member 23 (correspondingly convenient size) terminates at one end 24 thereof in corner member 25 and is sized in outer diameter to be slideably received by tubular member 15. Member 23 may be locked within member 15 to define selected spacing between corner members 17,25 by tightening fitting 21 onto threaded portion 19. Other means for locking members 15,23 at the selected spacing may be used as would occur to the skilled artisan guided by these teachings. Tubular members 27,28 are connected to respective corner members 17,25 perpendicular to respective members 15,23 as suggested in FIG. 1, are sized to slideably receive respective poles 12,13, and include respective set screws 29,30 for selectively positioning and fixing poles 12,13. Attachment chains 31*a*,31*b* interconnecting screws 29; 30 and members 15,23 prevent inadvertent detachment and loss of screws 29,30. An embodiment which was built in demonstration of the invention was configured with members 27,28 sized (3.7 cm i.d. by 4.5 cm o.d.) and spaced to receive the handle ends of a standard litter or a handle end of each of two standard litters supported in tiers, such as within an aircraft. Accordingly, in the demonstration unit, member 15 was 2.5 cm i.d. by 3.5 cm o.d., and members 15,23 were sized in length (35 cm and 44 cm respectively) to provide adjustable spacing between members 27,28 of 48 to 85.5 centimeters; poles 12,13 were about 23 centimeters long. The various component parts of assembly 10 were fabricated of aluminum for strength and light weight.

Figure 3:
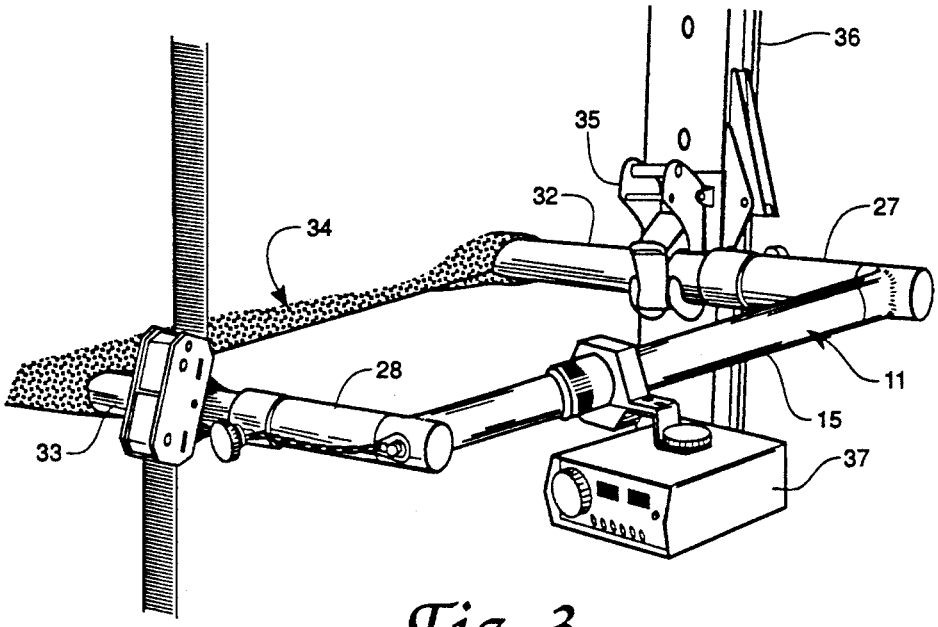
FIG. 3 shows a perspective view of the FIG. 1 bracket installed on one end of a standard litter within a medical vehicle.
Figure 4:
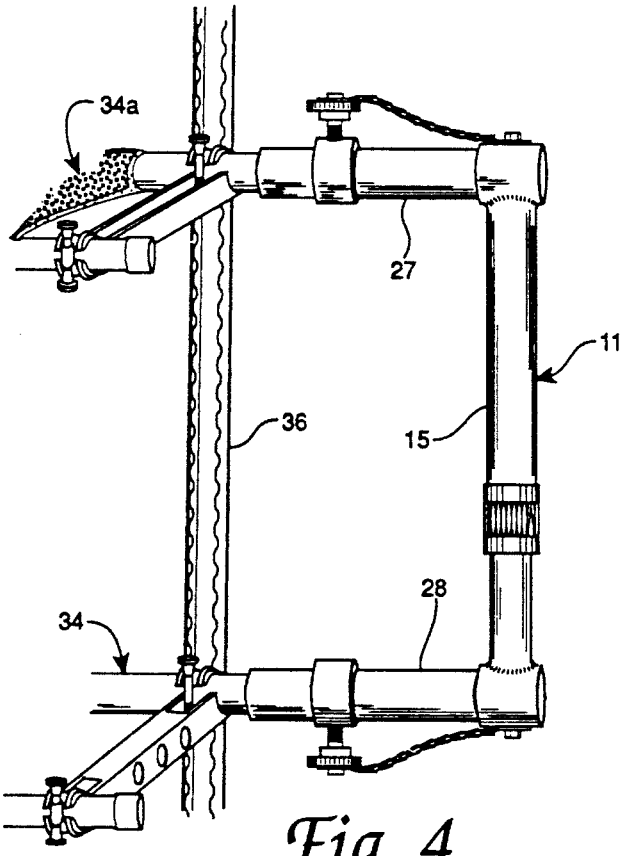
FIG. 4 shows the FIG. 1 bracket installed on corresponding ends of two tiered litters.
Figure 5:
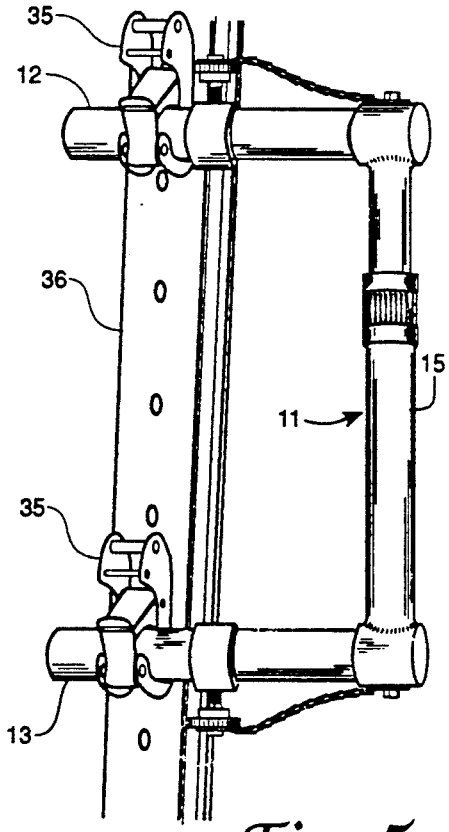
FIG. 5 shows the FIG. 1 bracket utilized to support medical equipment near a litter without direct attachment to the litter.

FIG. 3 shows a perspective view of bracket 11 installed on corresponding ends of handles 32,33 at one end of standard litter 34 supported in conventional fashion as by clamp 35 and stanchion 36 within a medical vehicle. In such an arrangement, bracket 11 may be adjusted to the minimum designed spacing between members 27,28 and one or more medical equipment items 37 may be supported substantially as shown. The surface of member 15 may be knurled to facilitate attaching and frictionally holding item 37 thereon. FIG. 4 shows bracket 11 installed on corresponding ends of two tiered litters 34,34*a* for the support therebetween of medical equipment items or the like (not shown in FIG. 4). FIG. 5 shows the utilization of assembly 10 including bracket 11 and poles 12,13 fitted to a pair of vertically displaced clamps 35 on stanchion 36 for the support of medical equipment near litters 34 without direct attachment of assembly 10 to the litters. Poles 12,13 provide the means for attachment at clamps 35.

The invention therefore provides a device for attaching medical equipment on or near a litter within a medical vehicle or the like. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. An equipment support device comprising:

(a) an extensible tubular member having first and second ends;

(b) means defining a threaded lock fitting along said extensible tubular member for locking said extensible tubular member at a preselected length;

(c) substantially parallel first and second tubular end members of preselected inner diametric size attached to said extensible tubular member at corresponding said first and second ends thereof for receiving substantially parallel first and second rod members; and (d) first and second set screws threadably received by corresponding said first and second tubular end members for releasably fixing said first and second rod members within corresponding said first and second tubular end members.

2. The device of claim 1 further comprising first and second short rod members received by and selectively positionable within corresponding said first and second tubular end members.

3. The device of claim 1 further comprising a short section of chain interconnecting one of said first and second set screws and one of the corresponding said first and second tubular end members.

4. The device of claim 1 wherein said extensible tubular member is sized to adjust in length from about 48 to 85.5 centimeters.

5. The device of claim 4 wherein the outer surface of said extensible tubular member is knurled to facilitate attachment thereto of a frictionally held equipment bracket.

6. An equipment support device comprising:

(a) a first tubular member having first and second ends and an externally tapered threaded portion and a diametric slot at the first end of said tubular member;

(b) a rod member having first and second ends, the first end of said rod member being sized to be slideably received by the first end of said first tubular member;

(c) an internally threaded lock fitting received by said threaded portion for selectively locking said rod member within said first tubular member defining a preselected length between the second end of said first tubular member and the second end of said rod member;

(d) first and second tubular end members of preselected inner diametric size attached respectively to the second end of said first tubular member and to the second end of said rod member, and disposed substantially perpendicular to respective said first tubular member and said rod member for receiving a pair of substantially parallel rods; and (e) first and second set screws threadably received by corresponding said first and second tubular end members for releasably fixing said parallel rods within said first and second tubular end members.

7. The device of claim 6 further comprising a short section of chain interconnecting one of said first and second set screws one of and the corresponding said first and second tubular end members.

8. The device of claim 6 wherein said first tubular member and said rod member are sized to define said preselected length of from about 48 to 85.5 centimeters.

9. The device of claim 8 wherein the outer surface of said first tubular member is knurled to facilitate attachment thereto of a frictionally held equipment bracket.

* * * * *